(12) United States Patent
Kane

(10) Patent No.: US 9,001,853 B2
(45) Date of Patent: Apr. 7, 2015

(54) INTERNAL OPTICAL MIXER PULSED AT LARMOR FREQUENCY

(71) Applicant: Thomas James Kane, Menlo Park, CA (US)

(72) Inventor: Thomas James Kane, Menlo Park, CA (US)

(73) Assignee: FASORtronics LLC, Albuquerque, NM (US)

( * ) Notice: Subject to any disclaimer, the term of this patent is extended or adjusted under 35 U.S.C. 154(b) by 0 days.

(21) Appl. No.: 13/859,412

(22) Filed: Apr. 9, 2013

(65) Prior Publication Data
US 2014/0301417 A1 Oct. 9, 2014

(51) Int. Cl.
*H01S 3/10* (2006.01)
*H01S 3/11* (2006.01)

(52) U.S. Cl.
CPC ........................................ *H01S 3/11* (2013.01)

(58) Field of Classification Search
USPC ............................ 372/21, 3, 10, 12, 26, 50.22
See application file for complete search history.

(56) References Cited

U.S. PATENT DOCUMENTS

| | | | |
|---|---|---|---|
| 4,879,723 A | | 11/1989 | Dixon |
| 5,142,542 A | * | 8/1992 | Dixon ............................... 372/22 |
| 5,333,142 A | | 7/1994 | Scheps |
| 5,388,113 A | | 2/1995 | Oka |
| 5,832,009 A | * | 11/1998 | Kikuchi ........................... 372/21 |
| 5,850,407 A | | 12/1998 | Grossman |
| 7,035,297 B1 | | 4/2006 | Denman |
| 7,039,077 B2 | * | 5/2006 | Furukawa et al. .............. 372/21 |
| 7,391,795 B2 | * | 6/2008 | Yumoto et al. .................. 372/22 |

OTHER PUBLICATIONS

Arisholm, "Optical parametric master oscillator and power amplifier for efficient conversion of high-energy pulses with high beam quality," in Optics Express, Sep. 6, 2004, vol. 12, No. 18.
Dabu, "Intracavity pumped nanosecond optical parametric oscillator emitting in the eye-safe range," in Applied Optics, Aug. 20, 2001, vol. 40, No. 24.
Higbie, "Magnetometry with mesospheric sodium," in Proceedings of the National Academy of Science, Mar. 1, 2011, vol. 108, No. 9.
Holzlohner, "Optimization of cw sodium laser guide star efficiency," http://arxiv.org/pdf/0908.1527.pdf, Oct. 1, 2009.
Rahm, "Pulse-to-pulse wavelength tuning of an injection seeded nanosecond optical parametric generator with 10 kHz repetition rate," in Applied Physics B, 2002, vol. 75, pp. 47-51.
Zendzian, "High-repetition-rate, intracavity-pumped KTP OPO at 1572 nm," in Applied Physics B, 2005, vol. 80, pp. 329-332.

* cited by examiner

*Primary Examiner* — Colleen A Matthews
*Assistant Examiner* — Vu A Vu (57) ABSTRACT

Pulsed, coherent light is generated by optical mixing which takes place inside the resonator of a pulsed laser oscillator. One of the beams to be mixed is generated by the pulsed laser, and the other by a distinct, external laser oscillator. If the light from the external oscillator is modulated, that modulation will be transferred onto the light generated by the optical mixing. Using sum frequency generation, light for sodium excitation, such as for a guide star, can be generated with the optimal modulation of spectral and temporal properties. If the pulse repetition frequency is chosen to be at or near the magnetic (Larmor) resonance of the sodium, then the amount of scattered light due to sodium excitation is enhanced, and the magnetic field at the location of the sodium atoms can be measured.

3 Claims, 3 Drawing Sheets

INTERNAL OPTICAL MIXER PULSED AT LARMOR FREQUENCY

STATEMENT OF GOVERNMENT INTEREST

This invention was made with U.S. Government support under contract No. N00014-11-0314, awarded by the Office of Naval Research. The U.S. Government has certain rights in this invention.

TECHNICAL FIELD OF THE INVENTION

This application relates to the generation and amplification of coherent optical radiation.

BACKGROUND OF THE INVENTION

In this document, I will use the word "light" interchangeably with "optical radiation," understanding that a range of invisible wavelengths which propagate similarly to light are included when either term is used.

The most common techniques for generating coherent light involve laser action. Laser action occurs when atoms or molecules in their excited state generate and amplify light at a specific wavelength determined by the energy difference between the excited state and the unexcited state of the atom or molecule. There is a limited set of wavelengths at which coherent light can be efficiently, reliably, and economically generated using direct laser action. Laser oscillators make use of laser gain and feedback to generate coherent light, and as a general rule do not need coherent light as an input.

A set of techniques known collectively as "nonlinear optics" make use of "optical mixing" to generate coherent light, using coherent light as an input. The light generated by optical mixing may be at a different wavelength from the input, or at the same wavelength but with amplified power. This expands the set of wavelengths at which coherent light can be generated and amplified beyond the set provided by laser action by itself. A widely used type of optical mixing is second harmonic generation, also known as frequency doubling, in which coherent light is generated at an optical frequency twice the optical frequency of the input. The wavelength of the output light produced by second harmonic generation is one-half the wavelength of the input light. This can be understood by considering the relationship between optical frequency and wavelength, which states that the product of the optical frequency and the wavelength is the invariant speed of light, according to the equation $$c = \lambda v \quad \text{(Eq. 1)}$$

where c is the speed of light, $\lambda$ is the wavelength, and v is the optical frequency.

In this document I will sometimes specify light by its wavelength, and sometimes by its optical frequency. Since the product of these two is the invariant speed of light, the specification of one specifies the other, and vice versa.

A type of optical mixing closely related to second harmonic generation is known as sum frequency generation. In sum frequency generation, the optical frequency of the generated light is at the sum of the optical frequencies of the two inputs, according to the equation $$v3 = v1 + v2 \quad \text{(Eq. 2)}$$

where v3 is the newly generated output optical frequency, and v1 and v2 are the two input optical frequencies. Second harmonic generation can be seen to be a special case of sum frequency generation, for the case of the two inputs being the same, that is to say, for the case of v1=v2.

An equation relating the wavelength of light generated by sum frequency generation to the wavelengths of the inputs, derived by combining Eqs. 1 and 2, is:

$$1/\lambda 3 = 1/\lambda 1 + 1/\lambda 2 \quad \text{(Eq. 3)}$$

where $\lambda 3$ is the newly generated output wavelength, and $\lambda 1$ and $\lambda 2$ are the two input wavelengths.

Another type of optical mixing is difference frequency generation, in which the generated light is at an optical frequency which is the difference between the optical frequencies of the two inputs. Equation 4 relates the optical frequencies involved in optical difference frequency generation, and is similar to Eq. 2, except that now v2 must be the larger of the two input optical frequencies, and v1 must be the smaller of the two input optical frequencies. The difference frequency, v3, is the newly generated output frequency.

$$v3 = v2 - v1 \quad \text{(Eq. 4)}$$

By combining and then simplifying Eq. 1 and Eq. 4, it can be shown that the wavelengths involved in difference frequency generation are related by the equation $$1/\lambda 3 = 1/\lambda 2 - 1/\lambda 1 \quad \text{(Eq. 5)}$$

where $\lambda 2$ is the shorter of the two input wavelengths, $\lambda 1$ is the longer input wavelength, and $\lambda 3$ is the newly generated wavelength.

There is a distinction between sum frequency generation and difference frequency generation relating to which optical frequencies grow in power, and which get depleted. In sum frequency generation, the coherent light at the newly generated optical frequency v3 increases in power at the expense of both of the two inputs, at optical frequencies v1 and v2. However, for difference frequency generation, the light at the lower input frequency v1 as well as the newly generated frequency v3 increase in power, at the expense of the light at the higher input frequency v2. Thus difference frequency generation can be used both to generate a new frequency v3, found by subtracting the lower from the higher of the two input frequencies, and to amplify light at the lower input frequency v1, all at the expense of the light at the higher input frequency v2. Amplification is a form of generation, for the case where the newly generated light is at a wavelength that is already present. This process of amplification, which is inherent in difference frequency generation, is often called "optical parametric amplification." The distinction between difference frequency generation and optical parametric amplification is simply in which output beam is utilized.

Optical mixing can in principle take place in any material, but sum and difference frequency generation take place efficiently only in crystals. Thus the material in which optical mixing occurs will be referred to as a nonlinear crystal.

A good reference on these general facts of optical mixing is "Nonlinear Optics", Third Edition, by Robert W. Boyd, published by Academic Press in 2008.

A useful feature of optical mixing is that when light at one input optical frequency v1 is modulated, and the light at the other input optical frequency v2 is not modulated, then the output light at optical frequency v3 after optical mixing will have exactly the modulation of the light at the first optical frequency v1 (except for a possible change of sign.) Thus not only power can be transferred between different optical frequencies, but also modulation. The two types of modulation are phase modulation and amplitude modulation, and both are transferred from the input optical frequency to the generated optical frequency.

To say that light is not modulated is equivalent to saying that the light consists of a single optical frequency, rather than the range of optical frequencies present in all natural light and most laser light. Optical mixing with one of the inputs consisting of a single optical frequency will result in the modulation of the other input being transferred to the newly generated output. I will use the expression "single-frequency oscillation" to describe laser oscillation which produces light which for practical purposes consists of a single optical frequency. A "single-frequency laser" is a laser oscillator which produces light which for practical purposes consists of a single optical frequency.

In the simplest configuration for optical mixing, two beams of light to be optically mixed pass through a nonlinear crystal, with no feedback path in either beam. Such designs tend to be inefficient for beams of low and moderate powers, with only a small fraction of the light converted to the new optical frequency. An important feature of optical mixing is that the efficiency of the process increases with the input power, until efficiency is limited as it approaches the ideal efficiency of 100%. Thus, only at relatively high power is the optical mixing process efficient. For the robust and reliable nonlinear material lithium triborate (chemical formula $LiB_3O_5$, common name LBO), input power in excess of 1000 watts is needed to reach a good level of efficiency, such as 50% conversion. Even for less-robust nonlinear materials such as periodically poled lithium niobate ($LiNbO_3$), which suffers from degradation when used in the visible or ultraviolet, a power of greater than 10 watts is needed in order to reach 50% efficiency.

A prior-art technique for improving efficiency is described by Dixon et. al. in U.S. Pat. No. 4,879,723, issued in 1989. In Dixon's design, the nonlinear crystal is placed inside the resonator of a laser, so that it is traversed by the internal resonant beam of the laser. One of the beams of light to be optically mixed (by sum frequency generation, in this case) is the internally circulating beam within the laser resonator. The other comes from an external source, specifically for Dixon's design, from a laser diode. This approach has two advantages. First, the internally circulating beam within the resonator has a higher power, due to the feedback within the resonator, and this higher power improves the efficiency of the optical mixing process. Second, for the beam which is resonant, light not converted in one pass through the nonlinear crystal is recycled due to the feedback of the resonator, and has additional opportunities to be converted, again raising efficiency.

For the level of power typically available from practical lasers, Dixon's design will still have low efficiency, especially when robust nonlinear materials such as LBO are used. Concentrating the laser energy into pulses would improve efficiency, since the instantaneous power can thereby be much higher than the average power, and instantaneous power is what determines the conversion efficiency of optical mixing. Roughly speaking, considering an optical mixing process with a fixed level of average power available, the efficiency can be doubled by concentrating the light into pulses with a peak instantaneous power twice the average power. With peak power ten times the average power, efficiency is increased tenfold. Of course, these efficiencies are ultimately limited as efficiency approaches 100%, but this simple rule gives a rough guide to the large enhancement to efficiency that is possible by pulsing the light to be converted.

Often, a pulsed beam is what is desired for an application, as is the case for laser radar and materials processing.

Thus both for efficiency and utility, pulsed light is desired in place of the steady, or continuous-wave, light described by Dixon.

A prior-art technique for optical parametric amplification is described by Gunnar Arisholm, Ørnulf Nordseth, and Gunnar Rustad, "Optical parametric master oscillator and power amplifier for efficient conversion of high-energy pulses with high beam quality," Optics Express, vol. 12, no. 18 (6 Sep. 2004). Though this paper describes successful efforts to achieve improved beam quality, the beam quality is "high" only in comparison with earlier optical parametric amplifiers. The beam quality parameter they achieved was $M^2=2.3$, where a value of $M^2=1$ is perfect, and typical lasers used for laser radar must have $M^2$ less than 1.3. When beams are generated by optical mixing at low efficiency, the beam quality of the output is typically as good as the beam quality of the input. When conversion efficiency gets higher, it becomes difficult to generate a beam which has good beam quality. This is due to the complex effects which take place as the input beam is significantly converted, or "depleted." Once a beam is fully depleted, back-conversion occurs—which means that the generated light is "back-converted" to the input wavelength! For a realistic beam, which is more intense on center than off-center, 100% conversion occurs on-center before the efficiency over the whole beam reaches 50%. But if you increase total beam power to improve efficiency off-center, the center back-converts, actually dropping in efficiency, and you get a beam with a dip in the center.

It would be desirable to break the connection between depletion and efficiency, and to create a design which is efficient but has low depletion, so that beam quality could be maintained.

Denman et. al., in U.S. Pat. No. 7,035,297 issued in 2006, disclosed a design for a sum-frequency generator based on resonating both of the frequencies to be summed in the same resonator, which is an external resonator instead of a laser resonator. This design is efficient, but it requires that both of the input beams be unmodulated, single-optical-frequency light. This eliminates the possibility of transferring modulation on the input beam to the output beam. Also, it requires precise matching of the light into the external resonator, creating difficult tolerances on both alignment and cavity length. Though the Denman design has been successfully used to excite mesospheric sodium atoms, as needed to produce artificial guide stars for astronomy, the lack of modulation reduces the efficiency of sodium excitation, and the challenging tolerances make the design expensive to produce.

It would be desirable to have a device which can efficiently convert pulsed, modulated light at one optical frequency to another optical frequency, while maintaining the modulation.

SUMMARY OF THE INVENTION

In accordance with one embodiment, coherent light is produced by optically mixing two coherent beams of light, with one of the beams being the internally circulating beam of a pulsed laser oscillator, the other being generated by a distinct laser oscillator, and the mixing taking place in a nonlinear crystal inside the resonator of the pulsed laser oscillator.

ADVANTAGES

Accordingly several advantages of one or more aspects are as follows: to provide pulsed coherent light at a set of wavelengths unavailable from lasers; to provide this light efficiently and with high power and high beam quality; to provide the capability to modulate this light despite the lack of modulators for the power and wavelength of the light; to efficiently amplify pulsed light while maintaining high beam quality; to amplify light in the eye-safe wavelength range; and to provide light with the wavelength, spectral distribution, and pulse format optimized for the excitation of sodium atoms. Other advantages of one or more aspects will be apparent from a consideration of the drawings and ensuing description.

BRIEF DESCRIPTION OF THE DRAWINGS

The q-switched laser is designed for oscillation at a single frequency, in that the resonator is a unidirectional ring resonator and a seed beam is injected into the q-switched laser from a seed oscillator. Light from the other laser oscillator is modulated and amplified before it enters the nonlinear crystal. This embodiment enables the generation of powerful modulated light.

DRAWINGS—REFERENCE NUMBERS

Figure 1:
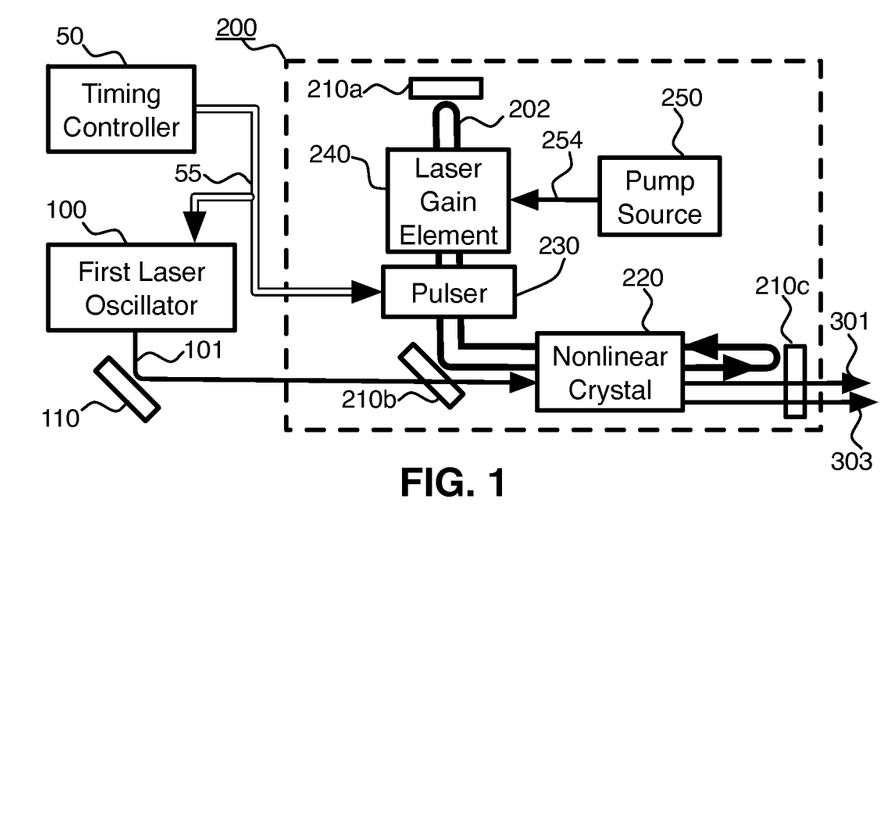
FIG. 1 shows an embodiment in which coherent light from one laser oscillator is optically mixed with the pulsed, coherent light which is internally circulating inside a second, pulsed laser oscillator. The nonlinear crystal in which the mixing takes place is traversed repeatedly by the internally circulating light, but only a single time by the light from the first oscillator. The resonator mirrors of the pulsed oscillator define an L-shaped resonator. At any point in the resonator there is circulating light going in both directions. A resonator such as this, in which the light must retrace its path to return to its starting point, is known as a linear resonator.
Figure 2:
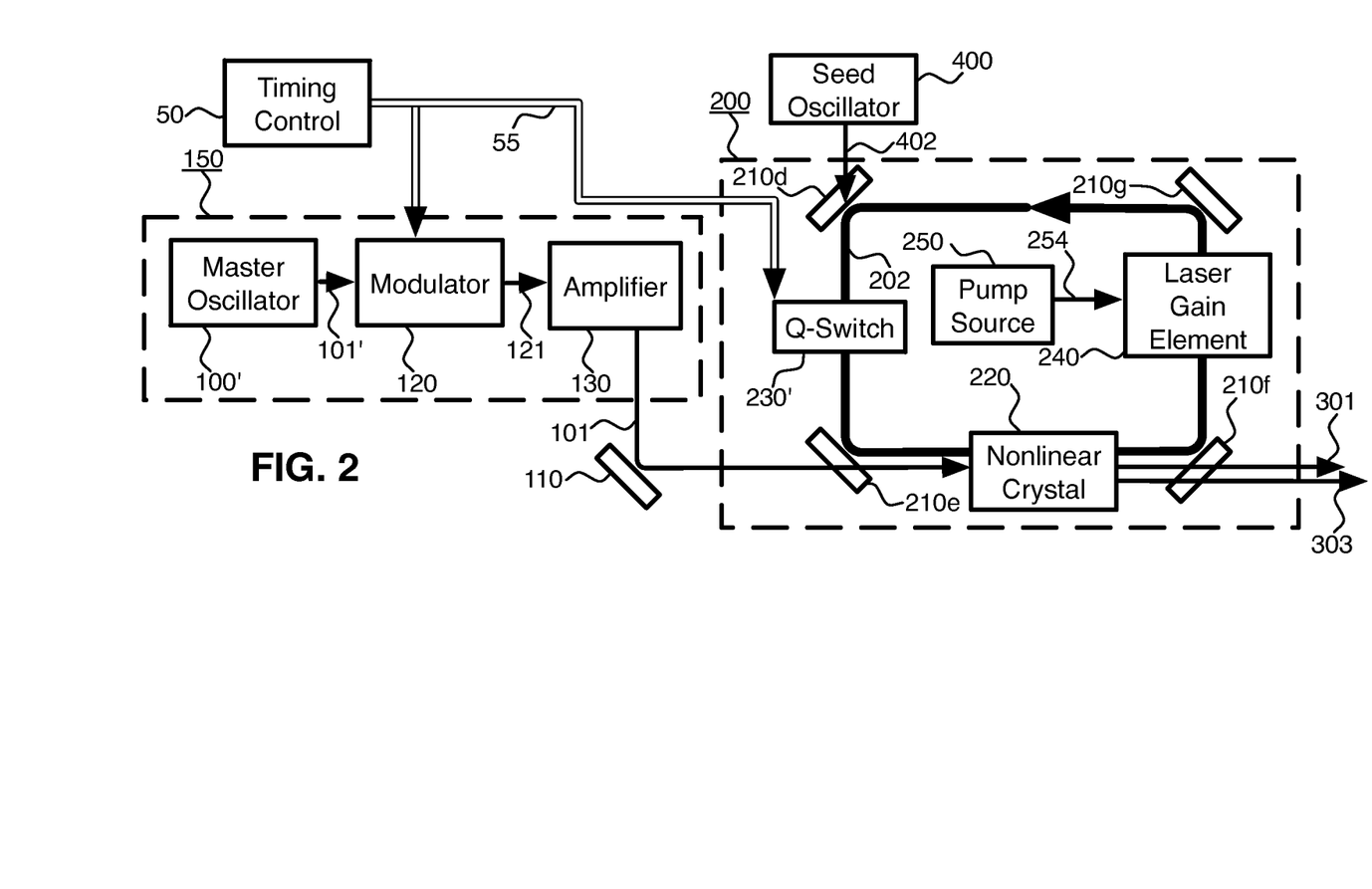
FIG. 2 shows an embodiment in which the pulsed laser oscillator is a q-switched laser. The resonator mirrors of the pulsed oscillator define a rectangle-shaped resonator. At any point in the resonator there is circulating light going in only one direction. This type of resonator is known as a unidirectional ring resonator.

50 Timing controller
55 Timing signal
100 Laser oscillator at first wavelength $\lambda 1$
100' Laser oscillator at first wavelength $\lambda 1$ when it is a master oscillator
101 Beam of coherent light at first wavelength $\lambda 1$
101' Beam of coherent light at first wavelength $\lambda 1$ produced by master oscillator
110 Turning mirror for directing beam into nonlinear crystal
120 Modulator
121 Beam of light output from modulator
130 Amplifier
150 Coherent light source comprising master oscillator and amplifier
200 Pulsed laser oscillator
202 Internally circulating pulsed light at second wavelength $\lambda 2$
210a-c Laser resonator mirrors of linear resonator of FIG. 1
210d-g Laser resonator mirrors of ring resonator of FIG. 2
220 Nonlinear crystal
230 Pulser
230' Pulser when it is a q-switch
240 Laser gain element
250 Pump source
254 Energy output from pump source
301 Beam of coherent light output from nonlinear crystal at first wavelength $\lambda 1$
303 Coherent light generated in nonlinear crystal at third wavelength $\lambda 3$
400 Seed oscillator
402 Seed beam at second wavelength $\lambda 2$
410 Turning mirror for transmitting beam into sodium atoms
500 Telescope
600 Sodium atoms

DETAILED DESCRIPTION

One embodiment of the generator of coherent light is shown schematically in FIG. 1.

A laser oscillator 100 produces a beam of coherent light 101 at a wavelength $\lambda 1$. A pulsed laser 200 comprises resonator mirrors 210a-c, nonlinear crystal 220, pulser 230, and laser gain element 240. Laser gain element 240 is energized, or "pumped," by energy 254 from pump source 250. The beam of coherent light 101 is directed by turning mirror 110 through resonator mirror 210b, which is transmissive for wavelength $\lambda 1$, into the nonlinear crystal 220. Turning mirror 110 is one possible means for directing a beam as desired, but many others, including lenses, optical fibers, and prisms, are possible. The nonlinear crystal 220 is inside the resonator of the pulsed laser 200. This resonator is defined by resonator mirrors 210a-c which are arranged so that there is a path for light such that resonant, internally circulating beam 202 will reflect off of each mirror 210a-c and retrace the same path repeatedly. Three resonator mirrors are shown, but fewer or more are possible. Nonlinear crystal 220, pulser 230, and laser gain element 240 are traversed by internally circulating beam 202. The mirrors 210a-c are designed to be highly reflective at a wavelength $\lambda 2$ at which the laser gain element 240 has gain, so that internally circulating beam 202 with wavelength $\lambda 2$ will circulate with low loss if the three traversed elements are not lossy. If the gain of laser gain element 240 exceeds the losses seen by internally circulating beam 202, then the internally circulating beam 202 will build up in power and the pulsed laser 200 will be said to be lasing.

A mode-locker is one type of pulser for causing the laser oscillator to be a pulsed laser oscillator. Mode-lockers create pulsations which occur once for each round-trip time of the internally circulating light. A second means of creating pulsations is to modulate gain element 240, perhaps by modulating the power 254 from pump source 250. A third way to achieve pulsation is the use of a q-switch in the role of pulser 230.

Mode-locking can typically result in a laser with a peak power which is between 10 and 100 times its average power. Thus mode-locking can enhance optical mixing efficiency by a similar factor. Q-switching can result in peak power between 10 and 10,000 times the average power.

Both techniques cause small or no reduction in average power; thus with average power unchanged, and peak power greatly enhanced, the amount of generated power due to optical mixing is greatly enhanced.

The purpose of a q-switch is to quickly transition from a "closed," high-loss state that inhibits lasing to an "open," low-loss state which permits lasing. The presence of a q-switch, defined as a device capable of quickly transitioning from a high-loss to a low-loss state, in a position traversed by the internal resonant beam of the laser oscillator, is what defines a laser oscillator to be a q-switched laser. The timing of the transitions of q-switch from closed to open and from open to closed is controlled by a signal produced by a timing controller.

When the externally generated beam of coherent light 101 and the internally circulating beam 202 are present simultaneously in nonlinear crystal 220, the process of optical mixing will generate a pulsed, coherent output 303 at wavelength $\lambda 3$. Resonator mirror 210c is designed to efficiently transmit wavelength λ3, so that it may be put to use externally. When the type of optical mixing is difference frequency generation, there will be a beam of coherent light 301 at wavelength λ1 which is more powerful than the beam of coherent light 101 which entered the crystal—that is to say, the beam of light 101 will have been amplified in crystal 220. This amplified beam of light 301 may be more useful than the beam 303 at the newly generated wavelength, since the amplification factor can be very high, well above 1000. When the amplified beam is the useful output of the system, the system is considered to be an optical parametric amplifier. When the type of optical mixing is sum frequency generation, beam 301 will be weaker than beam 101, and probably not useful.

All three resonator mirrors 210a-c are designed to have low reflectivity at wavelength λ1, so that very little light at wavelength λ1 makes a complete round trip in the resonator, and then a second traversal of nonlinear crystal 220 in the original direction. This low reflectivity at λ1 is one means of making sure that beam 101 passes only once through nonlinear crystal 220, but there are others, such as the use of prisms to separate the beams in angle. If beam 101 passes through nonlinear crystal 220 more than once, it will interfere either constructively or destructively with itself. Uncontrolled interference will create undesirable random modulation of generated beams 301 and 303. Since beam 101 passes a single time through nonlinear crystal 220, there is no undesirable modulation, and only desired modulation carried on beam 101 is passed on to generated beams 301 and 303.

In order for the generation of coherent light in nonlinear crystal 220 to be efficient, a number of conditions must apply. First and simplest, the externally generated beam of coherent light 101 and the internally circulating beam 202 must be spatially overlapped inside nonlinear crystal 220. This can be accomplished by properly orienting and positioning turning mirror 110, or using some other means of directing beam 101. The schematic figures show separate beams inside nonlinear crystal 220. This is for purposes of clarity; the multiple beams inside of nonlinear crystal 220 should be considered to be occupying the same space.

A more challenging task is the selection of nonlinear crystal 220. This crystal must have low loss at the three wavelengths involved in the optical mixing process, and especially at the wavelength λ2, which is the wavelength of the internally circulating beam 202 of the pulsed laser. The nonlinear crystal must have an adequate nonlinear coefficient, which is the measure of the amount of optical mixing taking place over the scale of a few atoms in the nonlinear material. Most importantly, the nonlinear crystal must be selected, oriented and temperature-controlled so that it is "phase-matched" for the desired type of optical mixing. Without phase matching, destructive interference between light generated at different positions along the length of the nonlinear crystal results in very low total light generation. Phase matching allows the whole length of the crystal to work in phase to generate a powerful output. Phase matching occurs when the three wavelengths λ1, λ2 and λ3 propagate at velocities that lead to conservation of momentum of the photons. This occurs when the sum of the momenta of the two longer-wavelength photons equals the momentum of the photon with the shortest wavelength. Software such as "SNLO," available at http://www.as-photonics.com, can calculate the correct crystal orientation and temperature for phase matching. One nonlinear material is lithium triborate, or LBO, with chemical formula $LiB_3O_5$. For LBO, at a temperature of 40 centigrade, with beams propagating along the x crystalline axis, there will be phase matching for sum frequency generation of the wavelengths 1319 nm and 1064 nm to generate 589 nm. Under the same condition there is also phase matching for difference frequency generation with 589 nm being the shorter input wavelength λ2 and either 1319 nm or 1064 nm being the longer input wavelength λ1. Another nonlinear material is lithium niobate, chemical formula $LiNbO_3$, including periodically poled lithium niobate. Periodically poled lithium niobate, with an easily realized poling period near 30 microns, can generate infrared wavelengths in the range 1.5 to 4 microns by difference frequency generation when the shorter input wavelength λ2 is near 1.064 micron. Thus it can also amplify in the range 1.5 to 4 microns by optical parametric amplification. Many other nonlinear crystals exist; many are tabulated in the SNLO software, and data included in SNLO provide support for the material selection process. The selection of a nonlinear crystal includes the selection of the composition, but also the orientation and temperature. SNLO will calculate the tolerances on the temperature and the angle of the nonlinear crystal, and the required length of the nonlinear crystal as measured in the direction of beam propagation. Typical lengths for nonlinear crystals are 10-30 millimeters, and for these lengths a typical temperature tolerance is ±0.1 degree centigrade.

There are many options for the choice of laser gain element 240. All lasers and laser gain elements are based on a material which when energized, or "pumped", can amplify light by laser action. The laser gain element 240 may be based on neodymium-doped yttrium aluminum garnet (Nd:YAG) or neodymium-doped yttrium vanadate (Nd:Vanadate) or some other solid state gain material. The gain element 240 is energized by pump source 250, which may comprise semiconductor lasers or discharge lamps or some other pump source. A gas gain element, based on a gaseous-phase gain material such as carbon dioxide, may also be used, in which case the pump source 250 would be a radio frequency power source or an electrical discharge. Complete gain elements based on Nd:YAG, including the pump source, are available from Cutting Edge Optronics of St. Charles, Mo.

Typically mode-lockers and q-switches are based on either acousto-optic or electro-optic effects. Mode-lockers and q-switches are available from Gooch and Housego of Melbourne Fla.

The amount of pulsed coherent light produced by optical mixing depends on several variables. These include the composition and length of nonlinear crystal 220; the diameters of the beams of light 101 and 202 inside the nonlinear crystal; the instantaneous power of the light from the local oscillator 101 and the light circulating within the q-switched laser 202; and very critically on whether all these components are properly co-aligned. A person skilled in the art will be able to make these tradeoffs appropriately and produce light by optical mixing.

Another embodiment of the generator of coherent light is shown schematically in FIG. 2. The coherent light source 150 at wavelength λ1 is a specific design known as a MOPA, an acronym for Master Oscillator Power Amplifier. A MOPA will always comprise a master oscillator 100' and an amplifier 130; modulator 120 is an option. The master oscillator 100' is a relatively low-power source of coherent light, such as a fiber oscillator, a distributed feedback semiconductor laser, or a nonplanar ring oscillator. The master oscillator may be pulsed or continuous. The oscillator is tunable over a small range, so λ1 can be considered to be somewhat variable. The output light 101' from the master oscillator 100' may be coupled into optional modulator 120. This modulator 120 may periodically block or transmit the light so that pulses are created, in which case the output beam 121 from the modulator is a beam of pulsed coherent light. Pulse timing is controlled by signal 55 from timing controller 50. The modulator may also modulate the light in phase or amplitude. The modulator 120 may be a waveguide-type modulator, built using an electro-optical material such as lithium niobate, or it may be an acousto-optic modulator, or another type. Some types of oscillators are integrated with the modulator in a single monolith. The output from the modulator 121 is coupled into an amplifier 130, which may be a rare-earth-doped fiber amplifier, with the rare earth being ytterbium, neodymium, thulium or erbium, or it may be a bulk crystal amplifier similar in design to laser gain element 240, or some other type of amplifier. The output of the amplifier 130 is directed by turning mirror 110 through resonator mirror 210e into the nonlinear crystal 220.

As compared to FIG. 1, FIG. 2 has three changes in the pulsed laser 200. The first is that the pulser is a q-switch, so that the pulsed laser oscillator is a q-switched laser. Second, the laser resonator is now configured as a unidirectional ring resonator, rather than a linear resonator. As shown in FIG. 2, there are four resonator mirrors, but any other number greater than one is possible. In a ring resonator, none of the resonator mirrors 210d-g are at normal incidence, so the internally circulating beam of light 202 is never reflected directly back upon itself. Thus the resonant light does not overlap itself as it returns to the starting point, as it does for a linear resonator. This eliminates the problem of standing waves, which occur when two beams occupy the same space. Standing waves make it more difficult for a laser to oscillate at a single frequency, due to non-uniform gain depletion, called "hole burning."

The third difference from FIG. 1 is the presence of a seed oscillator 400, which is a single-frequency laser oscillator. This seed oscillator provides a low-power seed beam 402 at the wavelength of the pulsed laser, $\lambda 2$. This low-power seed beam 402 is injected into the q-switched laser resonator on a path which overlaps the internally circulating beam 202. In FIG. 2, the seed beam 402 is shown passing through partially transmitting resonator mirror 210d. Another way to inject the seed beam 402 is to take advantage of the fact that the q-switch 230' ejects light from the resonator when it is in the closed state. If seed beam 402 is injected along the same path as the ejected light, it will be injected into the internally circulating beam 202.

The injection of a single-frequency seed beam into a q-switched laser is known as "injection seeding," and is an effective means to cause a q-switched laser to oscillate at a single frequency. When two light fields are mixed in a nonlinear crystal, the modulation of each field is impressed onto the generated field. If one of the fields is single frequency, that is to say, un-modulated, then the modulation of the other field will be cleanly transferred to the generated field. Thus the complete system of FIG. 2 generates pulses of coherent light at the wavelength $\lambda 3$, but with the same modulation that was on the coherent light beam 101 at wavelength $\lambda 1$.

In many cases, modulation at $\lambda 1$, while the beam is at low power, is convenient, since modulators are commercially available for use at low power and wavelength $\lambda 1$, while modulators for use at high power at wavelength $\lambda 3$ cannot be obtained. This embodiment enables the production of modulated, pulsed light at a power and wavelength which might otherwise be impossible.

There are means other than the use of a seed oscillator for causing the q-switched laser to oscillate at a single frequency. One means is a wavelength-selective etalon that is traversed by internally circulating beam 202, and is tilted relative to the beam. An etalon is a thin piece of glass with two reflective surfaces. At most wavelengths these surfaces reflect enough light that they are lossy, and impede lasing. Over a narrow range of wavelengths the reflections from the two surfaces interfere destructively, canceling each other so that there is low loss. If this range of low loss contains one optical frequency at which the laser may oscillate, the laser will oscillate at that one optical frequency. Another means for causing single frequency oscillation is a q-switch with a slowed opening time, which may be accomplished by slowing the transition of the timing signal 55 which controls the q-switch. The slow transition provides one optical frequency time to out-compete the others and dominate.

Another embodiment, configured for a specific application, can also be described with reference to FIG. 2. This embodiment provides an amplifier for near infrared radiation, to be used as a component in a coherent laser radar system.

There is a need for a high gain, pulsed amplifier for use in the near infrared, "eye-safe" spectral region. Such an amplifier could be a component in a coherent laser radar system. Such a laser radar system can create an image of a remote target, as well as find the range and velocity of that target. An advantageous "eye-safe" wavelength is 1.53 microns, where there is excellent data on increased eye-safety, and where there are a variety of optical components, such as amplifiers, detectors, and modulators, available because 1.53 microns is also a widely used fiber communication wavelength. Unfortunately, the fiber communication type amplifiers, typically erbium-doped fiber amplifiers, do not reach the high peak power needed for a laser radar transmitter. The embodiment to be described can provide such an amplifier.

In this embodiment, since this system is used as an amplifier, the useful output is beam 301, an amplified version of beam 101. The wavelength $\lambda 1$ of both these beams is 1.4 microns or longer, with a nominal value of 1.53 microns. The assumed wavelength $\lambda 2$ of the q-switched laser is in the range from 1.0 to 1.1 microns, where efficient lasers based on the gain materials ytterbium-doped yttrium aluminum garnet (Yb:YAG) and Nd:YAG are available. The nominal value of $\lambda 2$ is 1.05 microns. Using Eq. 5, we see that $\lambda 3$, the newly generated wavelength, is 3.35 microns, for the nominal values of $\lambda 1$ and $\lambda 2$. In this amplifier embodiment, the most valuable output is the amplified signal 301 at $\lambda 1$, but the signal 303 at $\lambda 3$ may also be useful.

In this embodiment, the entire coherent light source 150 is identical to what is commonly used as an optical data transmitter for telecommunication. The master oscillator 100' is a fiber-coupled distributed feedback semiconductor laser. The modulator 120 is a waveguide-type electro-optic modulator, also fiber coupled. The amplifier 130 is an erbium-doped fiber amplifier.

For a typical coherent laser radar application, the desired pulse repetition frequency is near 1000 hertz, and the desired pulse duration is near 100 nanoseconds. (Pulse repetition frequency is the rate at which the pulses are produced, in units of pulses per second, or hertz.) A desired pulse energy for laser radar is 10 millijoules. The peak power of a 10 millijoule pulse with a 100 nanosecond pulse duration is near 100 kilowatts. This is too high to be reached by an erbium-doped fiber amplifier, which will typically have a peak power limit near 10 watts. Thus a multiplicative gain of about 10,000 is needed, equivalent to 40 decibels, to amplify the power available from the fiber amplifier up to the power needed for laser radar. Using a nonlinear crystal made of PPLN, with a length of 20 millimeters, the required intensity of the internally circulating beam 202 to generate this amount of gain is less than 1 megawatt per square millimeter. Such a level of gain has been demonstrated in PPLN using prior art designs in which the nonlinear crystal is outside of the laser resonator; see for example, M. Rahm et. al., "Pulse-to-pulse wavelength tuning of an injection seeded nanosecond optical parametric generator with 10 kHz repetition rate," *Appl. Phys. B*, vol. 75, pp. 47-51 (2002). The prior art design had mediocre efficiency and beam quality. The amplifier of this embodiment provides higher efficiency and better beam quality than prior-art designs.

The reason that an optical parametric amplifier based on this embodiment can break the usual link between high efficiency and low beam quality is that it enables high conversion efficiency without high depletion. The internally circulating beam is not depleted in any one pass through the nonlinear crystal. Yet there is high overall efficiency because after multiple passes each photon in the internally circulating beam has a very high probability of having been converted. The processes of laser gain and diffraction that occur in each round trip restore the circulating beam, so that it never has the distorted beam shape of a depleted beam, even though most photons are ultimately converted.

An attractive laser gain material for this embodiment is ytterbium-doped yttrium aluminum garnet (Yb:YAG). This material has a longer energy storage time and a lower gain relative to Nd:YAG. This will be preferred for cases where the pulse repetition frequency is lower and the pulse duration is longer. For example, a pulse repetition frequency of 10 kilohertz and a pulse duration of 20 nanoseconds would be best achieved with the gain material Nd:YAG; for a pulse repetition frequency of 1 kilohertz and a pulse duration of 100 nanoseconds, Yb:YAG would be preferred.

For coherent laser radar applications, the amplified output beam 301 must consist of a single frequency. This will be possible only if the q-switched laser is oscillating at a single frequency. Thus the use of the seed oscillator or other means for ensuring single-frequency oscillation will typically be needed. Synchronization of the modulator and the q-switch will typically be needed, so that the pulses to be amplified arrive at the nonlinear crystal when there is an adequate power in the internally circulating beam. A standard means for synchronization is to drive both devices with a common timing control 50, with a timing signal 55 distributed to all components needing synchronization.

Another embodiment that can be described with reference to FIG. 2 is a generator of visible light with the precise wavelength and spectral distribution needed for efficient excitation of sodium atoms. This may be used to produce a "guide star", used as a reference in the adaptive optical system of a large telescope.

This application requires the excitation of sodium atoms in the mesosphere, which is a layer of the atmosphere about 100 kilometers above the earth's surface. When excited by a laser, these atoms will resonantly scatter the light, creating an artificial "guide star." A guide star is a bright, distant, point-like object used as a reference for the adaptive optical systems which are used in large astronomical observatories. Bright natural stars can be used as guide stars, but most astronomical objects of interest are not close enough to a bright star. Artificial guide stars produced by lasers can be positioned as needed near astronomical objects of interest. Adaptive optical systems improve the image quality possible from ground-based telescopes, which is otherwise severely limited by the earth's atmosphere. Sources of coherent light are needed which produce bright artificial guide stars.

There is another application for a pulsed coherent light source capable of exciting mesospheric sodium. This application is remote magnetometry. The earth's magnetic field can be measured with resolution of 1 nanotesla or better by measuring the resonance frequency of sodium atoms precessing in the geomagnetic field, which is nominally at 350 kilohertz for a nominal geomagnetic field of 50 gauss. This resonance frequency is called the Larmor frequency, and the precession is known as Larmor precession. This measurement technique is described by James M. Higbie, et. al. in "Magnetometry with Mesospheric Sodium,", *Proceedings of the National Academy of Sciences*, vol. 108, p. 3522 (2011). The Larmor frequency can be measured by slightly adjusting the pulse repetition frequency of the source of light which is exciting the sodium, while monitoring the amount of light scattered by the sodium atoms. The amount of light scattered reaches a maximum at the Larmor frequency. By finding the frequency at which scattering is maximized, the Larmor frequency is found. The Larmor frequency is linearly proportional to the magnetic field at the atoms, with a constant of proportionality which is universal for sodium atoms, and which is known. Thus magnetic field at the sodium atoms can be measured.

Recent research, as described by R. Holzlohner et. al. in "Optimization of cw sodium laser guidestar efficiency," *Astronomy and Astrophysics*, vol. 510, (February 2010) has shown that the optimum beam of light to be used for exciting mesospheric sodium atoms would have the following properties:

1. It would have as its primary wavelength 589.15908 nm, measured in vacuum.
2. It would have a sideband wavelength at 589.15709 nm. This is equivalent to a separation in optical frequency between the sideband and the primary of approximately 1.72 gigahertz. The sideband should contain 10% to 20% of the total power. Since the sideband is at a shorter wavelength than the primary wavelength, it is said to be blue-shifted (that is, at a higher optical frequency, corresponding to a shorter wavelength) relative to the primary wavelength.
3. Light at both the primary wavelength and at the sideband wavelength should be slightly spread in optical frequency. The optimal amount of optical frequency spread, or line width, is proportional to the available laser power. Ideally, the line width should be selectable in the range up to 1000 megahertz.
4. In order to take advantage of the enhancement of scattering which takes place at the Larmor frequency, the light should be pulsed, with a duty cycle of approximately 20%, and a pulse repetition frequency dependent on the earth's magnetic field amplitude. (Duty cycle is defined to be the ratio of the pulse duration to the time between corresponding points on adjacent pulses.) For a magnetic field of 50 gauss, the desired pulse repetition frequency is about 350 kilohertz, or a subharmonic of 350 kilohertz, where the subharmonic of any frequency is defined to be that frequency divided by an integer. The relation between field and frequency is linear; for higher or lower magnetic field amplitudes, the desired frequency scales higher or lower in a linear way.

Following is a description of an embodiment which generates light with all of these desirable properties.

The output light 101' from the master oscillator 100' has a wavelength of approximately 1064.55 nm. It is slightly tunable. The master oscillator 100' could be a nonplanar ring oscillator, such as the model 125-1064-25, available from JDSU, of Milpitas, Calif. Other types of master oscillators, such as fiber lasers or distributed-feedback semiconductor lasers, would also work, as long as they were single-frequency oscillators.

The modulator 120 is capable of modulating both phase and amplitude. Alternatively, two modulators could be used, one for phase and one for amplitude, or more, if each individual modulation pattern were applied to its own modulator.

An intensity modulator slices the light into pulses at the desired pulse repetition frequency of (nominally) 350 kHz and the desired duty cycle of 20%. A phase modulator puts the desired line width on the light. At random intervals the phase modulator abruptly changes phase by ±180 degrees, which is called a "phase reversal." The average number of phase reversals per second will determine the line width of the phase-modulated light, if the input line width is negligible.

Additional phase and amplitude modulation can create the desired sideband. If both the phase and amplitude are modulated at 1.72 gigahertz, with the relative amplitudes and phases of modulation chosen properly, then a single, blue-shifted sideband will be created. Phase modulation alone would also create the desired blue-shifted desired, with the disadvantage that a useless red-shifted sideband would also be created.

All these distinct modulations could be done using distinct phase or amplitude modulators, or only one of each could be used, with the distinct signals combined electrically. The light output 121 after modulation has the pulse pattern, line width and sideband needed for a beam of light meant to create a guide star—but at the wrong wavelength, and at vastly too little power.

The power is boosted by a single-stage or multi-stage amplifier 130. The first stage is a polarization-maintaining fiber amplifier. This amplifier uses rare-earth atoms, either ytterbium or neodymium, to create gain at 1064 nm and nearby wavelengths. The most powerful fiber amplifiers reach a peak power of over 100 watts. Multiple stages of fiber amplification may be used.

For more power, a "power amplifier" based on a bulk laser gain element may also be used. This power amplifier would use a crystalline material such as Nd:YAG or Nd:Vanadate. Crystalline amplifiers have lower gain than fiber amplifiers, but they can reach a higher instantaneous power without optical damage. A gain factor of five or greater is reasonable to expect from a crystalline amplifier, and more if the crystalline amplifier is traversed twice.

The output from the power amplifier needs only one more change to become optimal for guide star creation—it needs to be shifted in wavelength.

The q-switched laser 200 uses the laser material Nd:YAG. The mirrors 210d-g are coated to reflect the 1319 nm wavelength of Nd:YAG and transmit the 1064 nm wavelength. The seed oscillator 400 produces coherent radiation at the wavelength at 1319.31 nm, with a slight amount of tunability. The seed oscillator could be a nonplanar ring oscillator, such as the model 126-1319-100, available from JDSU, of Milpitas, Calif. The presence of the seed oscillator ensures that the q-switched laser will oscillate at a single frequency. The timing of the pulses in the 1319-nm q-switched laser is matched to the timing of the pulses from the 1064-nm MOPA, since both are under the control of timing controller 50. If the two oscillators, the 1319 nm seed oscillator 400 and the 1064-nm master oscillator 100', are properly tuned, then the exact wavelength for an optimized guide star, 589.15908 nm, will be generated, with the desired line width, sidebands and pulse format. The system will be an efficient source for sodium excitation.

In an alternative embodiment for producing the 589.15908 nm sodium excitation wavelength, the q-switched laser is a 1354-nm Nd:Vanadate laser. The advantage of Nd:Vanadate at 1354 nm over Nd:YAG at 1319 nm is that Nd:Vanadate has higher gain and efficiency. Higher gain makes it easier to operate the q-switched laser at a high repetition rate.

In order to generate light at $\lambda 3=589$ nm, the master oscillator must be at the wavelength of $\lambda 1=1043$ nm, for the case of $\lambda 2=1354$ nm. A fiber laser or a DFB semiconductor laser can provide light at 1043 nm. Ytterbium fiber will amplify effectively at this wavelength. A disadvantage of using this approach is that there is no high-gain crystalline power amplifier which can operate at 1043 nm. An alternative power amplifier at 1043 nm could be one based on double-clad rod-type fibers, such as are available from NKT Photonics of Denmark.

Figure 3:
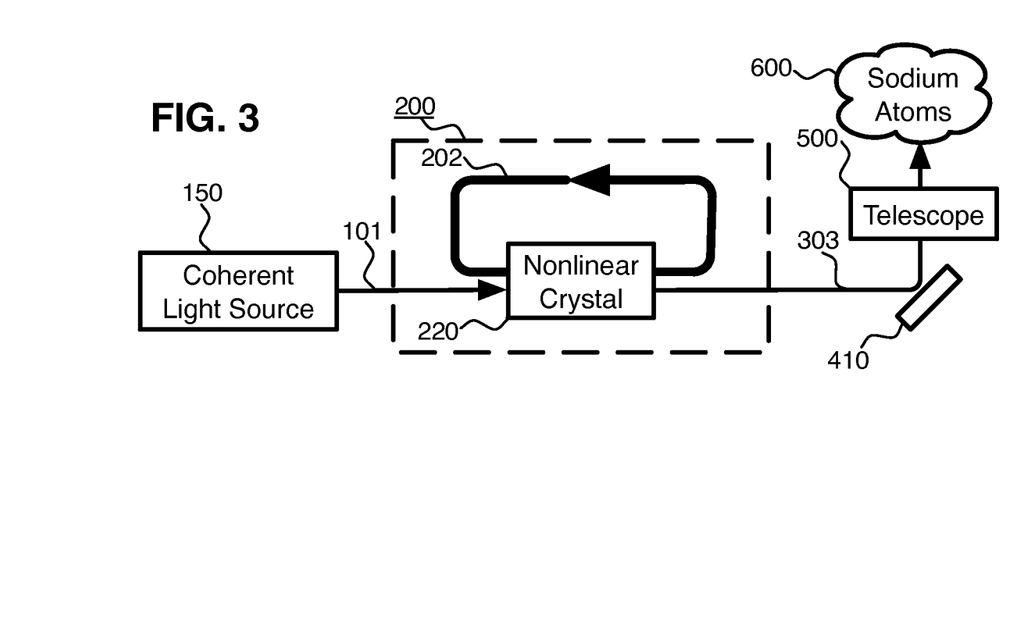
FIG. 3 shows an embodiment used for the excitation of sodium atoms.

FIG. 3 shows schematically an embodiment in which sodium atoms 600 are excited by a beam of light 303 generated by sum frequency generation. This sum frequency generation takes place when a beam 101 from coherent light source 150 intersects with the internal resonant beam 202 of q-switched laser oscillator 200 in nonlinear crystal 220. Turning mirror 410 and telescope 500 are one means of transmitting the beam of light 303 up to sodium atoms 600, which are excited by the light. Such a system could be used for either creating a guide star or for remotely measuring magnetic field.

It is to be understood that the preceding is merely a detailed description of several embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A method of exciting sodium atoms, comprising:
   a. selecting a first and a second wavelength which when frequency summed produce a third wavelength capable of exciting said sodium atoms,
   b. generating internally circulating pulsed coherent light at said second wavelength by laser action in a laser oscillator, wherein the pulse repetition frequency of said internally circulating pulsed coherent light is chosen to be near the Larmor frequency of said sodium atoms, or near a subharmonic of that frequency,
   c. positioning a nonlinear crystal so that it is traversed by said internally circulating pulsed coherent light,
   d. generating a beam of coherent light at said first wavelength,
   e. passing said beam of coherent light at said first wavelength once through said nonlinear crystal to generate a pulsed beam of coherent light at said third wavelength by sum frequency generation,
   f. transmitting said pulsed beam of coherent light at said third wavelength to said sodium atoms.

2. The method of claim 1 further comprising modulating the phase of said beam of coherent light at said first wavelength, whereby said beam of coherent light at said third wavelength is also modulated, and said sodium atoms are more efficiently excited.

3. A method of remotely measuring a magnetic field in a region containing sodium atoms, comprising:
   a. selecting a first and a second wavelength which when frequency summed produce a third wavelength capable of exciting said sodium atoms,
   b. generating internally circulating pulsed coherent light at said second wavelength by laser action in a laser oscillator, wherein the pulse repetition frequency of said internally circulating pulsed coherent light is chosen to be near the Larmor frequency of said sodium atoms, or near a subharmonic of that frequency, c. positioning a nonlinear crystal so that it is traversed by said internally circulating pulsed coherent light,
d. generating a beam of coherent light at said first wavelength,
e. passing said beam of coherent light at said first wavelength once through said nonlinear crystal to generate a pulsed beam of coherent light at said third wavelength by sum frequency generation,
f. transmitting said pulsed beam of coherent light at said third wavelength to said sodium atoms,
g. adjusting said pulse repetition frequency to find the Larmor frequency, whereby the magnetic field at the sodium atoms can be determined.

* * * * *